United States Patent
Guo et al.

(10) Patent No.: US 10,197,410 B2
(45) Date of Patent: Feb. 5, 2019

(54) DYNAMIC REAL-TIME CARPOOL MATCHING

(71) Applicant: International Business Machines Corporation, Armonk, NY (US)

(72) Inventors: Shang Q. Guo, Cortlandt Manor, NY (US); Canturk Isci, Secaucus, NJ (US); Jonathan Lenchner, North Salem, NY (US); Maharaj Mukherjee, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 1026 days.

(21) Appl. No.: 14/543,949

(22) Filed: Nov. 18, 2014

(65) Prior Publication Data

US 2016/0138928 A1    May 19, 2016

(51) Int. Cl.

| | |
|---|---|
| *G06Q 10/06* | (2012.01) |
| *G01C 21/34* | (2006.01) |
| *G06Q 10/02* | (2012.01) |
| *G06F 17/30* | (2006.01) |
| *G06Q 50/30* | (2012.01) |

(52) U.S. Cl.
CPC ... *G01C 21/3438* (2013.01); *G06F 17/30241* (2013.01); *G06F 17/30864* (2013.01); *G06Q 10/02* (2013.01); *G06Q 10/063114* (2013.01); *G06Q 50/30* (2013.01)

(58) Field of Classification Search
CPC .............................................. G06Q 10/063114
USPC ........................................................ 705/7.15
See application file for complete search history.

(56) References Cited

U.S. PATENT DOCUMENTS

| | | | |
|---|---|---|---|
| 7,080,019 | B1 | 7/2006 | Hurzeler |
| 7,840,427 | B2 | 11/2010 | O'Sullivan |
| 7,941,267 | B2 | 5/2011 | Adamczyk et al. |
| 8,156,326 | B2 | 4/2012 | Di Giusto et al. |
| 2004/0148275 | A1* | 7/2004 | Achlioptas ........ G06F 17/30867 |

(Continued)

OTHER PUBLICATIONS

Wagner; Ttl: "Google Test Cars That Can Steer Without Drivers"; http://abclocal.go.com/kabc/story?section=news/technology&id=771, accessed Nov. 19, 2014.

(Continued)

*Primary Examiner* — Susanna M. Diaz
(74) *Attorney, Agent, or Firm* — Robert C. Bunker

(57) ABSTRACT

According to one exemplary embodiment, a method for real-time carpool matching is provided. The method may include receiving a plurality of carpool requests having a plurality of carpool route segments. The method may include determining at least one carpool match in real-time based on the plurality of carpool route segments. The method may include assigning each carpool match a viability value. The method may then include assigning a selected carpool match automatically for a user associated with the determined at least one carpool match, based on the assigned viability value associated with each carpool match within the at least one carpool match. The method may further include choosing a driver from a plurality of carpool participants, whereby the plurality of carpool participants is based on the selected carpool match. The method may also include sending the selected carpool match to the plurality of carpool participants.

18 Claims, 5 Drawing Sheets

(56) References Cited

U.S. PATENT DOCUMENTS

| | | | | |
|---|---|---|---|---|
| 2004/0158483 | A1* | 8/2004 | Lecouturier | G06Q 10/025 705/6 |
| 2004/0262940 | A1 | 12/2004 | Johnson | |
| 2008/0091342 | A1* | 4/2008 | Assael | G01C 21/3438 701/533 |
| 2008/0195428 | A1* | 8/2008 | O'Sullivan | G06Q 10/00 705/6 |
| 2008/0277183 | A1* | 11/2008 | Huang | B60R 25/00 180/271 |
| 2009/0234573 | A1* | 9/2009 | Notarantonio | G06Q 30/02 701/533 |
| 2009/0248587 | A1 | 10/2009 | Van Buskirk | |
| 2011/0145089 | A1 | 6/2011 | Khunger et al. | |
| 2011/0246246 | A1* | 10/2011 | Johnson | G06Q 10/02 705/5 |
| 2012/0109721 | A1 | 5/2012 | Cebon et al. | |
| 2013/0226365 | A1* | 8/2013 | Brozovich | G06Q 10/047 701/1 |
| 2013/0282357 | A1 | 10/2013 | Rubin et al. | |
| 2014/0188775 | A1* | 7/2014 | Lehmann | G01C 21/3438 706/46 |
| 2015/0142484 | A1* | 5/2015 | Huang | G06Q 10/063 705/7.11 |
| 2015/0317568 | A1* | 11/2015 | Grasso | G06Q 10/1093 705/5 |
| 2016/0025507 | A1* | 1/2016 | Bai | G01C 21/3438 701/400 |

OTHER PUBLICATIONS

IBM Inventors: "Reporting and/or Issuing Transportation Recommendations Based on Tracking of Trip Segments"; Jan. 27, 2009; Database: IP.Com; IP.Com No. IPCOM000178853D.
http://dynamicridesharing.org/, "the Purpose of DynamicRidesharing. org", accessed Jul. 14, 2014.
Pukhovskiy et al., "Real-Time Carpooling System", 2011 IEEE, pp. 648-649.
Ghoseiri et al., "Real-Time Rideshare Matching Problem", University of Maryland, Department of Civil and Environmental Engineering, College Park, MD, Jan. 2011, pp. 1-72.
http://dynamicridesharing.org/projects.php, "Dynamic Ridesharing Projects, Current, Past, and Proposed", accessed Jul. 14, 2014.
Eisenberg, "Need a Ride? Check your iPhone", http://www.nytimes.com/2008/12/21/business/21novelties.html?em&_r=0, Dec. 20, 2008, accessed Jul. 14, 2014.
http://dynamicridesharing.org/inhibitors.php, "What are the inhibitors?", accessed Jul. 14, 2014.
Nagare et al., "Multi-Agent Secure Dynamic Carpooling", International Journal of Soft Computing and Engineering, ISSN: 2231-2307, vol. 3, Issue-1, Mar. 2013, pp. 81-85.
Nagare et al., "Dynamic Carpooling Application Development on Android Platform", International Journal of Innovative technology and Exploring Engineering, ISSN: 2278-3075, vol. 2, Issue-3, Feb. 2013, pp. 136-139.
Schonberger et al., "A Self-Driving Future", http://daily.sightline.org/2013/06/04/a-self-driving-future/, accessed Jul. 14, 2014.
Holeywell, "Infrastructure & Environment, Report: States Need Guidance on Self-Driving Cars", http://www.governing.com/topics/transportation-infrastructure/gov-report, accessed Jul. 14, 2014.
Newcomb, "How Self-Driving Cars Will Change Transportation", http://editorial.autos.msn.com/blogs/autoblogpost.aspx?post=fd1dd24a. accessed Jul. 14, 2014.
Efrati, "Exclusive: Google Designing Its Own Self-Driving Car, Considers "Robo Taxi"", http://jessicalessin.com/2013/08/23/exclusive-google-designing-its-own-self-driving-car-considers-robo-taxi-2/, accessed Jul. 14, 2014.
Shankland, "How Google's robo-cars mean the end of driving as we know it", http://news.cnet.com/news/how-googles-robo-cars-mean-the-end-of-drivin . . . , accessed Jul. 14, 2014.
Mims, "Google Wants to Build Its Own Self-Driving Cars", http://www.citylab.com/commute/2013/08/google-wants-build-its-own-sec. accessed Jul. 14, 2014.
The autonomous car: The road to driverless driving—Telematics Update. http://analysis.telematicsupdate.com/v2x-safety/autonomous-car-road-driverless-driving#sthash.Zj1rYKwV.dpuf, accessed Jul. 14, 2014.
Collotta et al., "A Novel Trust Based Algorithm for Carpooling Transportation Systems", Kore University of Enna—Italy, 2nd IEEE ENERGYCON Conference & Exhibition, 2012/Sustainable Transportation Systems Symp, 2012 IEEE.

\* cited by examiner

DYNAMIC REAL-TIME CARPOOL MATCHING

BACKGROUND

The present invention relates generally to the field of computing, and more particularly to carpool matching.

Carpooling can be an effective way for commuters to reduce costs by having multiple people commute in one car. The traditional carpool model consists of a driver and passenger that know each other before hand and know that they share a common commuting route. More recently, through social media, two people that have not met before may discover they share a common commute and agree to carpool.

SUMMARY

According to one exemplary embodiment, a method for real-time carpool matching is provided. The method may include receiving a plurality of carpool requests. The method may also include determining at least one carpool match in real-time based on the received plurality of carpool requests. The method may further include assigning each carpool match within the at least one carpool match a viability value. The method may then include assigning a selected carpool match automatically for a user associated with the determined at least one carpool match, based on the assigned viability value associated with each carpool match within the at least one carpool match. The method may further include choosing a driver from a plurality of carpool participants, whereby the plurality of carpool participants is based on the selected carpool match. The method may also include sending the selected carpool match to the plurality of carpool participants.

According to another exemplary embodiment, a computer system for real-time carpool matching is provided. The computer system may include one or more processors, one or more computer-readable memories, one or more computer-readable tangible storage devices, and program instructions stored on at least one of the one or more storage devices for execution by at least one of the one or more processors via at least one of the one or more memories, whereby the computer system is capable of performing a method. The method may include receiving a plurality of carpool requests. The method may include receiving a plurality of carpool requests. The method may also include determining at least one carpool match in real-time based on the received plurality of carpool requests. The method may further include assigning each carpool match within the at least one carpool match a viability value. The method may then include assigning a selected carpool match automatically for a user associated with the determined at least one carpool match, based on the assigned viability value associated with each carpool match within the at least one carpool match. The method may further include choosing a driver from a plurality of carpool participants, whereby the plurality of carpool participants is based on the selected carpool match. The method may also include sending the selected carpool match to the plurality of carpool participants.

According to yet another exemplary embodiment, a computer program product for real-time carpool matching is provided. The computer program product may include one or more computer-readable storage devices and program instructions stored on at least one of the one or more tangible storage devices, the program instructions executable by a processor. The computer program product may include program instructions to receive a plurality of carpool requests. The computer program product may also include program instructions to determine at least one carpool match in real-time based on the received plurality of carpool requests. The computer program product may further include program instructions to assign each carpool match within the at least one carpool match a viability value. The computer program product may then include program instructions to assign a selected carpool match automatically for a user associated with the determined at least one carpool match, based on the assigned viability value associated with each carpool match within the at least one carpool match. The computer program product may further include program instructions to choose a driver from a plurality of carpool participants, whereby the plurality of carpool participants is based on the selected carpool match. The computer program product may also include program instructions to send the selected one carpool match to the plurality of carpool participants.

According to yet another exemplary embodiment, a method for real-time carpool matching is provided. The method may include receiving a plurality of carpool requests, whereby each carpool requests has a plurality of segments. The method may also include determining at least one segment-wise carpool match in real-time based on the received plurality of carpool requests. The method may further include assigning each segment-wise carpool match within the at least one carpool match a viability value. The method may then include assigning a selected carpool match automatically for a user associated with the determined at least one segment-wise carpool match, based on the assigned viability value associated with each of the plurality of segments within the at least one segment-wise carpool match. The method may further include choosing a driver from a plurality of carpool participants, whereby the plurality of carpool participants is based on the selected segment-wise carpool match. The method may also include sending the selected segment-wise carpool match to the plurality of carpool participants.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
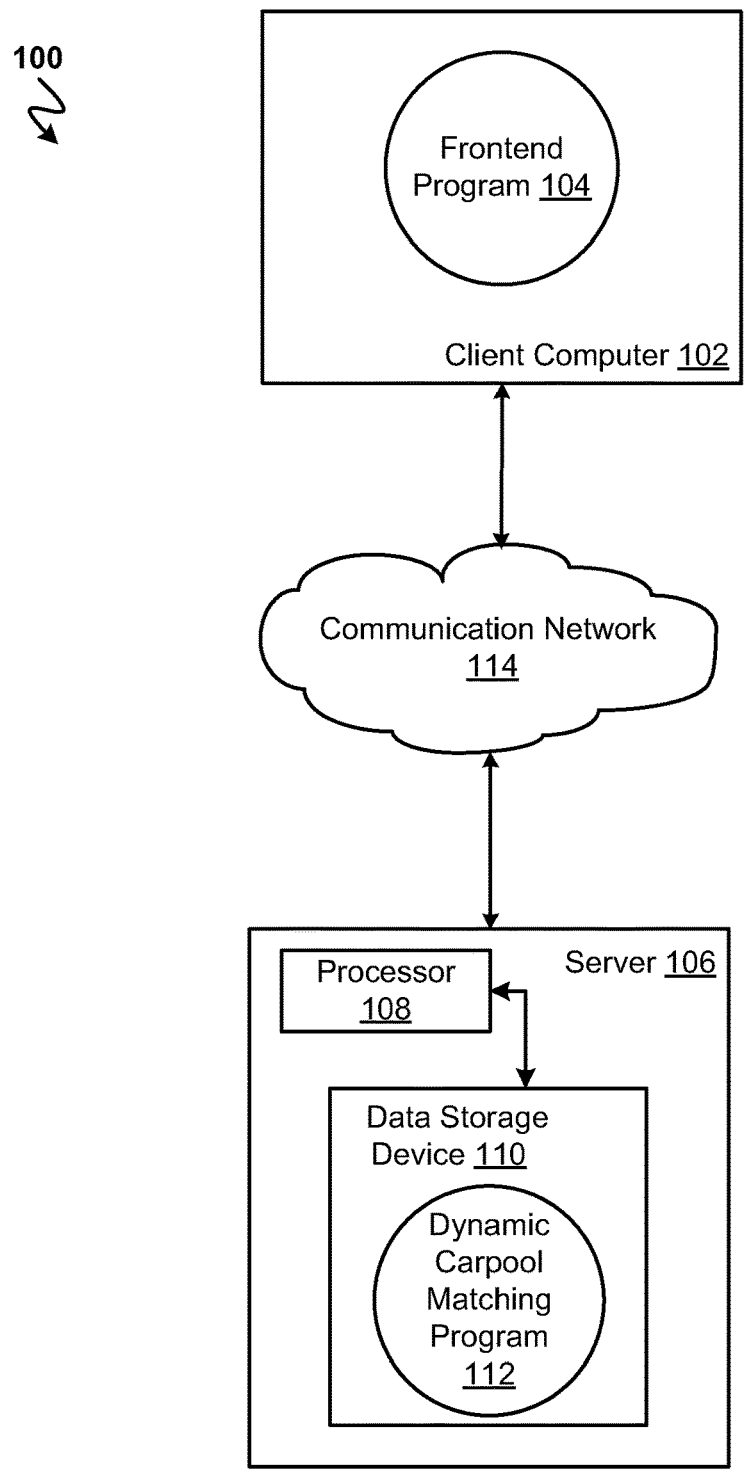
FIG. 1 illustrates a networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product for dynamic real-time carpool matching. Additionally, the present embodiments have the capacity to improve the technical field of carpool matching by dynamically determining segment-wise carpool matches in real-time.

As described previously, carpooling may be an effective way for commuters to reduce costs by driving in one car instead of driving multiple cars along the same route. Traditionally, carpool scenarios involve two people that know one another beforehand or meet each other through internet services, such as a social media site tailored for carpooling. Carpool participants that agree to carpool, usually carpool for an entire route (e.g., from a meeting point to work). This method of carpooling may be inefficient as people may not share a complete carpool route together and be eliminated from a carpool match while a combination of three or more participants may produce a common route. Multiple participants may be able to create a carpool route but the participants may not realize that they can from an efficient carpool route due to not knowing each other.

Therefore, it may be advantageous to, among other things, provide a way for people who have never met to be able to be dynamically matched in real-time for carpooling and for a carpooling route broken down into multiple segments that may utilize other carpoolers or public transportation to efficiently create a carpool route.

According to at least one embodiment, a process for dynamic real-time optimal segment carpool matching may first receive a request to carpool from a user indicating a desire to participate in a carpool arrangement. The request may be generated, for example, by a smartphone application or by an integrated automotive system (e.g., an electronic system that handles navigation, driver information, and/or entertainment) installed in the user's car. A user may indicate an interest in carpooling within the smartphone application or integrated automotive system after selecting a travel destination. Once the user has requested carpool participation, the user request may be forwarded to a carpool matching process along with ancillary information (e.g., destination, starting point, route, carpool partner preferences, constraints, time flexibility, etc.). Once the carpool request may be received by the process, the request may be published to a carpooling server.

The process may run on the carpooling server and may then analyze all carpooling requests published on the server, looking for compatible carpooling matches in real-time. The process may search for carpool matches by comparing complete routes and by searching for, and trying to maximize, matching constituent route segments. In evaluating potential matches, the process may generate a route overlap value that may represent the amount two routes overlap or the amount of route segments that overlap. Thus, the process may combine multiple carpool requests to create a composite route based on matching route segments from multiple carpool requests. The process may also consider having the user walk or ride a bike between short segments in lieu of being driven, or also consider if some type of mass transit may be optimal for a segment (e.g., bus). Additionally, the process may consider carpool partner acceptability criteria, convenient places to drop cars off to accomplish the carpooling, etc. when determining a carpool match. Carpool matches found by the process may each be assigned a viability value (e.g., percentage indicating how many criteria match) based on how close the match is to the original request.

After the process finds at least one carpool match, the carpool match having the highest viability value may be automatically chosen and forwarded to the user, or the user may be presented an ordered list of matches ranked by viability value, depending on a user preference to opt out of automatic matching. Once the user may have been assigned a carpool match, the user may be directed to a meeting point. Additionally, as a security measure, the carpool driver for a given segment may be chosen at random. The randomly chosen driver may also be overridden by the consent of the carpool participants.

The geolocation of a carpool participant may also be tracked by the process, for example, through using a global positioning system (GPS). If the process determines that the participant may have deviated from the prescribed course (i.e., the distance between the participant's geolocation and the prescribed route exceeds a predetermined threshold value), the process may alert the participant through a smartphone application or may generate an alert that may be sent to third party service personnel that may then call the participant to ask if the participant may no longer be participating in the carpool route. If the carpool participant may no longer be participating, the process may reanalyze other carpool requests in real-time for a substitute match for the user.

Finally, once the carpool route ends, the process may record events from the carpool route, such as noting if a participant may not have been timely for possible use in later carpool matching (e.g., a participant was five minutes late to a meeting point). The process may use timeliness information to weigh potential participants in future iterations (e.g., more prompt participants may be ranked higher as part of more viable matches).

According to at least one other embodiment, a participant profile may be generated for each carpool participant. The participant may include information in the participant profile such as the cost to themselves for having to drive out of their way or otherwise arrive at a particular meeting point that may be M miles (i.e., distance flexibility preference) or N minutes out of the way (i.e., time flexibility preference) from the participant's normal commute route. Participants may also declare the cost to use the participant's car for ride sharing (e.g., what the cost may be per mile). Cost information may be included in the participant profile and may also be sent along with the other ancillary information in the carpool request.

The process may then proceed as discussed above. The process may receive the carpool request and then the process may publish the request to the carpool server. Then the process may analyze the requests to find matches in real-time. Matches may also be output as an ordered list or assigned automatically based on user preference.

Choosing the driver for a segment may then be determined based on an optimization to equitably distribute driving responsibilities so that none of the potential drivers may have a net equity advantage based on the costs per mile or minutes out of the way previously stored in the participant's profile. The process may then assign the driver role based on the equitable optimization results and forward driving directions to the participants. Participant deviations may also be monitored and participants may be contacted if a participant deviates off course. Real-time substitute matches may be found and the equitable optimization may run again to assign the driver for the substitute match. Once the route completes, the data associated with the carpool transaction may be recorded for future matchmaking.

According to yet another embodiment, a first user who may wish to carpool may broadcast a request to carpool, for example, via a smartphone application or integrated automotive system over a wireless network (e.g., cellular network) to the carpool server. The request may include the first user's current geolocation and destination. The request may then be broadcast to cars neighboring the first user. A second user may respond by sending to the carpool server an indication that the second user may be interested in the carpool arrangement with the first user. The carpool server may then put the first user and second user in direct contact by cellular phone or other peer-to-peer or client-server method. The first user and second user may then negotiate terms (e.g., meeting location, drop off location, who may drive, monetary exchange, etc.) before meeting. Then, the users may meet and drive together until the drop off location. The above embodiment may also be implemented without an intermediary carpool server, such that the first user and the second user may communicate directly with one another to negotiate the carpool.

It may be appreciated that the above embodiments may be utilized in circumstances with self-driving vehicles in place of traditional vehicles with human drivers. For instance, the process for dynamic real-time optimal segment carpool matching may be applied to a taxi fleet of self-driving cars. The above embodiments may also apply to self-driving cars that may drive an owner to work, and while the owner is at work, the self-driving car that would otherwise be parked may be used for carpooling other people or as a taxi service applying the above embodiments to optimally transport people. A neighborhood may use one or more self-driving cars to shuttle neighborhood residents to a mass transit station (e.g., train station) to serve as an economical self-driving taxi service using the above embodiments. Residents may send requests to the self-driving car (e.g., via cell phone) indicating when the resident may need to be picked up and delivered to the mass transit station along with the resident's time flexibility. Residents with more time flexibility may then be charged less relative to other residents.

Referring now to FIG. 1, an exemplary networked computer environment 100 in accordance with one embodiment is depicted. The networked computer environment 100 may include a client computer 102 that is enabled to run a frontend program 104. The networked computer environment 100 may also include a server 106 with a processor 108 and a data storage device 110 that is enabled to run a dynamic carpool matching program 112 and a communication network 114. The networked computer environment 100 may include a plurality of client computers 102 and servers 106, only one of which is shown for illustrative brevity. The communication network may include various types of communication networks, such as a wide area network (WAN), local area network (LAN), a telecommunication network, a wireless network, a public switched network and/or a satellite network. It may be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with server computer 106 via the communications network 114. The communications network 114 may include connections, such as wire, wireless communication links, or fiber optic cables. As will be discussed with reference to FIG. 5, server computer 106 may include internal components 800a and external components 900a, respectively and client computer 102 may include internal components 800b and external components 900b, respectively. Client computer 102 may be, for example, a mobile device, a telephone, a PDA, a netbook, a laptop computer, a tablet computer, a desktop computer, or any type of computing device capable of running a program and accessing a network.

A program, such as a dynamic carpool matching program 112 may run on the server computer 106. The dynamic carpool matching program 112 may be used to dynamically match carpool participants in real-time based on overlapping carpool route segments within a complete carpool route. The dynamic carpool matching program 112 is explained in further detail below with respect to FIGS. 2, 3, and 4.

Figure 2:
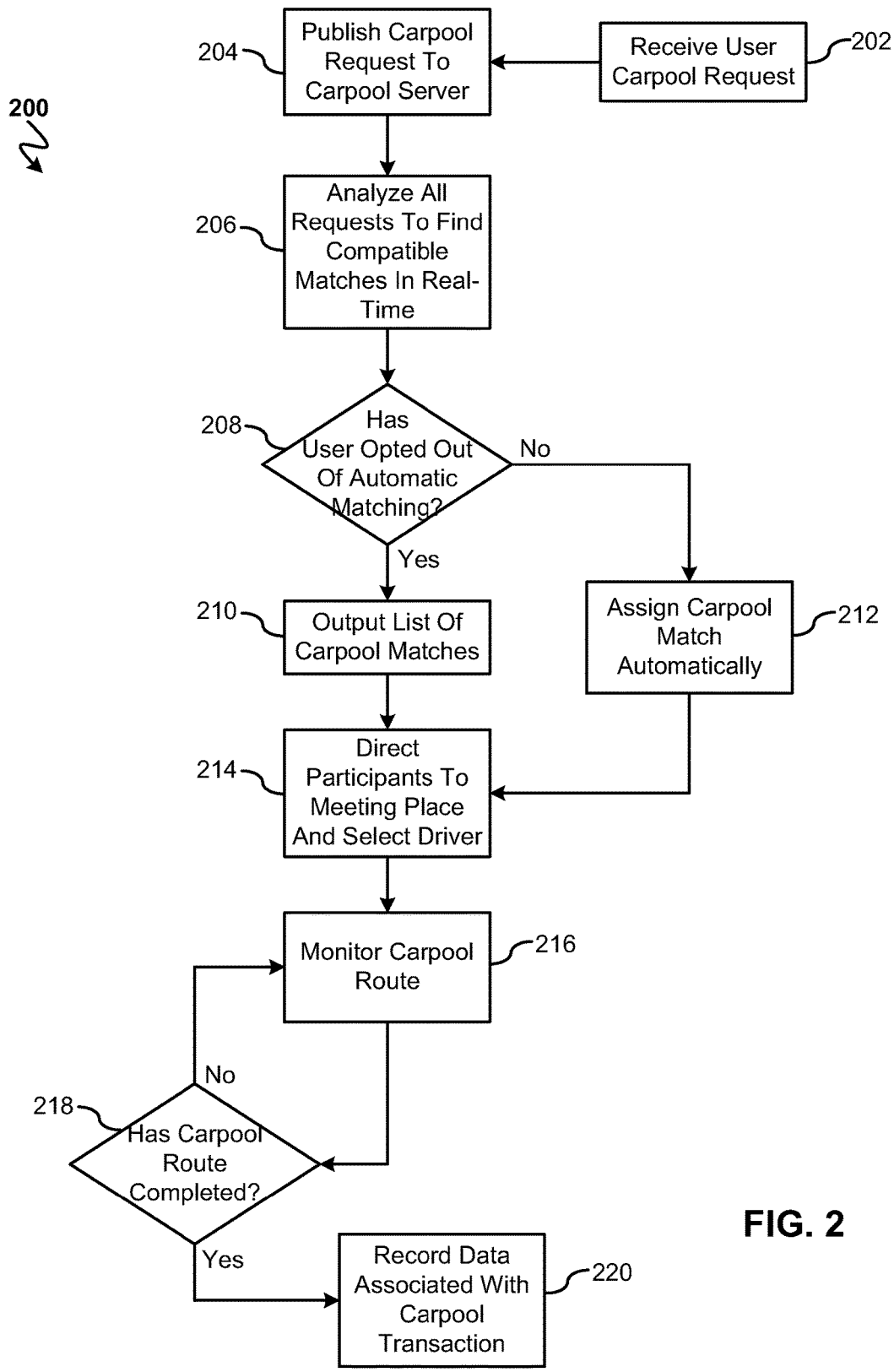
FIG. 2 is an operational flow chart illustrating a process for dynamic real-time carpool matching according to at least one embodiment.

Referring now to FIG. 2, an operational flow chart illustrating the exemplary optimal segment matching process 200 by the dynamic carpool matching program 112 (FIG. 1) according to at least one embodiment is depicted.

At 202, the optimal segment matching process 200 may receive a user carpool request. According to at least one embodiment, the user may indicate a desire to participate in a carpool through a carpool request that may include match information such as the user's name, starting location, drop off point, preferences about what kind of passengers are acceptable (e.g., gender, age, etc.), minimum length of ride to consider carpooling, automatic matching preference, and time flexibility. The carpool request may be generated by a frontend program 104 (FIG. 1) with a user interface such as a smartphone application or a program running on an integrated computer device (i.e., client computer 102 (FIG. 1)) located within the user's car (e.g., a navigation system). Additionally, users may register with a third party route monitoring service in order to participate in carpooling by submitting personal information (e.g., user picture, driver license information, phone number, destination, etc.) for the security of other participants who may not know each other.

After the user inputs the match information, the carpool request may be generated and sent to the optimal segment matching process 200 running on an electronic device, such as a carpool server 106 (FIG. 1). For example, a user who wishes to participate in a carpool may use the frontend program 104 (FIG. 1) running on an integrated navigation system installed in the user's car (e.g., client computer 102 (FIG. 1)) to indicate that the user would like to carpool through a user interface feature, such as an onscreen button. Once the user indicates an interest in carpooling, the frontend program 104 (FIG. 1) may output a dialog box with fields that the user may populate with the match information (e.g., user's name, starting location, drop off point, preferences about what kind of passengers are acceptable, minimum length of ride to consider carpooling, automatic matching preference, time flexibility, etc.) for use in generating the carpool request. The generated request may then be sent through a communication network 114 (FIG. 1), such as a cellular network, to the optimal segment matching process 200 running on the carpool server 106 (FIG. 1).

Next, at 204, the optimal segment matching process 200 may publish the received carpool request to the carpool server 106 (FIG. 1). According to at least one embodiment, the optimal segment matching process 200 may be running on the carpool server 106 (FIG. 1) or on a separate electronic device that may access the carpool server 106 (FIG. 1). After receiving the carpool request with match information, the optimal segment matching process 200 may then store the request and match information in a data repository, such as a carpool database, located on a data storage device 110 (FIG. 1) within the carpool server 106 (FIG. 1). As multiple carpool requests may be received, the optimal segment matching process 200 may continue to add the additional requests to the carpool database.

Then, at 206, the requests stored in the database may then be analyzed for matching criteria in real-time. According to at least one embodiment, before creating a route, the optimal segment matching process 200 may first filter candidate participant matches based on passenger acceptability criteria preferences (e.g., age, gender, etc.) specified by a user. For example, participants that may not match the age preference set by the user may be filtered out prior to calculating a carpool route. Additionally, the optimal segment matching process 200 may also filter out candidate participants based on the user's preference for the minimum length of ride to consider carpooling.

The optimal segment matching process 200 may then calculate a carpool route by considering, and trying to maximize, the length of route overlap achieved by combined carpool requests. The optimal segment matching process 200 may also consider route segment (i.e., subdivided parts of a complete route) overlap, convenient meeting places to drop off automobiles (e.g., parking lots), and other factors that may be used to generate compatible carpool matches (e.g., time constraints, cost of fuel sharing, etc.). For example, a carpooling scenario may include three carpool participants A, B, and C. Carpool participant A's complete commute route may include four segments $A_1$-$A_4$, carpool participant B's complete route may include three segments $B_1$-$B_3$, and carpool participant C's complete route may include three segments $C_1$-$C_3$. If $A_1$ overlaps $B_1$, $A_2$ overlaps $B_2$, $A_3$ overlaps $C_2$, and $A_4$ overlaps $C_3$, the optimal segment matching process 200 may create a composite segment carpool route for A using B and C as drivers. The generated route may include having B pick up A at the start of $A_1$, the common start point for both A and B, and driving A along $A_1$ (i.e., $B_1$) and $A_2$ (i.e., $B_2$) and before dropping A off at the end of $A_2$. Participant B may then drive along $B_3$ to reach B's destination. Participant C may drive along $C_1$ before picking up A at the end of $A_2$ and drive A along $A_3$ (i.e., $C_2$) and $A_4$ (i.e., $C_3$) and drop A off at the end of $A_4$, the common destination for both A and C.

According to at least one other embodiment, the optimal segment matching process 200 may include spatial and temporal adjustments. For example, if a first driver drops off a participant at a location on the first driver's route that may not be along a second driver's route, the optimal segment matching process 200 may integrate public transportation or having the participant walk to reach a point along the second driver's route for pickup. The extra effort by the participant to travel from the drop off point along the first driver's route to the pickup point along the second driver's route may include a negotiated price term. Temporal adjustments may be made if the participants can agree with time adjustments based on the participant's specified time flexibility range (e.g., N additional minutes beyond what an optimal route would normally take) for waiting to pick up a participant or for a participant to wait to be picked up. Additionally, the optimal segment matching process 200 may also consider alternate routes for the participants that may not be ideal, yet may still fall within participant preferences for time flexibility and/or maximum added distance that the participant may tolerate.

According to at least one embodiment, once the optimal segment matching process 200 may have determined at least one potential carpool match, the optimal segment matching process 200 may assign a viability value to each match. The assigned viability value may represent how close the carpool match fits the user's route and preferences. For example, carpool matches fitting more closely with the user's route and preferences may be assigned a higher viability value. The optimal segment matching process 200 may then create a list of the potential carpool matches and order the list based on the viability value assigned to each potential carpool match.

At 208, the optimal segment matching process 200 may determine if the user has opted out of automatic matching. According to at least one embodiment, the optimal segment matching process 200 may access the carpool request corresponding to the user stored in the carpool database. The optimal segment matching process 200 may then read the user's automatic matching preference that may be stored in the carpool request.

If the optimal segment matching process 200 determines that the user has opted out of automatic matching at 208, the optimal segment matching process 200 may output a list of potential matches at 210 for the user to choose from. According to at least one embodiment, the optimal segment matching process 200 may send the list of potential matches generated at 206 to the frontend program 104 (FIG. 1). The frontend program 104 (FIG. 1) may then output the list to the user and provide a way for the user to select a desired match from the list. The list may also be ordered according to the viability of the match to the user. The optimal segment matching process 200 may then receive the user's selection. For example, the optimal segment matching process 200 may send the frontend program 104 (FIG. 1) running on the user's navigation system (i.e., client computer 102 (FIG. 1)) the list of matches in order of viability (i.e., based on the viability value assigned to each potential match). The frontend program 104 (FIG. 1) may then output the list in order of viability to the user. The user may then select a match from the list (e.g., touch a touch screen region corresponding to a match in the list) that the frontend program 104 (FIG. 1) may send back to the optimal segment matching process 200, indicating the user's selection.

However, if the optimal segment matching process 200 determines that the user has not opted out of automatic carpool matching at 208, the optimal segment matching process 200 may automatically select the most viable match (i.e., select the carpool match with the highest assigned viability value) to assign to the user at 212.

Next, at 214, the optimal segment matching process 200 may select which participant may be the driver in the carpool arrangement and send the user the assignment information (e.g., meeting place, route to drive, and the driver) based on the match selected by the user at 210 or automatically selected for the user at 212. According to at least one embodiment, the optimal segment matching process 200 may select the driver randomly for security purposes. Random driver assignment may also be overridden by the consent of the participating parties in the carpool match. The optimal segment matching process 200 may then send the assignment information to the frontend program 104 (FIG.

1). The frontend program 104 (FIG. 1) may receive the assignment information and output the assignment information to the user. For example, if the frontend program 104 (FIG. 1) runs on a navigation device (i.e., client computer 102 (FIG. 1)) integrated into the user's car, the assignment information may display a dialog box indicating the meeting place and time, who the selected driver may be, who the passenger may be, and offer to load the driving route into the navigation system (i.e., client computer 102 (FIG. 1)).

Then, at 216, the optimal segment matching process 200 may monitor participants in the carpool route. According to at least one embodiment, the optimal segment matching process 200 may track participants via the global positioning system (GPS) to determine the participants' geolocation, comparing the participants' geolocation against the prescribed route at predetermined time intervals (e.g., every five minutes). If the optimal segment matching process 200 detects a participant's geolocation may have deviated from the route (e.g., the difference between a participant's geolocation and the prescribed route exceeds a threshold distance value), the optimal segment matching process 200 may generate an alert to send to a third party (e.g., service personnel) or some other entity. Additionally, the optimal segment matching process 200 may send an alert automatically to the participant. Criteria used to determine if an inconsistency may have occurred may vary. Such as, for instance, if the optimal segment matching process 200 predicts that a participant may not reach the meeting point within a prescribed time window. Once a third party has received an alert from the optimal segment matching process 200 with ancillary information (e.g., participant's phone number, name, assignment information, route, etc.), third party personnel may call the participant to determine if the participant may no longer be participating in the carpool.

According to at least one other embodiment, if the user indicates that the user may no longer be participating in the carpool route in response to a call from third party personnel, third party personnel may send a request to the optimal segment matching process 200 to return to 206 to reanalyze potential carpool matches for a substitute participant. According to yet another embodiment, the optimal segment matching process 200 may return to 206 to reanalyze for potential substitute carpool matches automatically once a participant's deviation from the route exceed a predefined threshold (e.g., if based on the participant's geolocation and time to meet at the meeting place, the projected best-case scenario to reach a meeting place may place the participant at the meeting place beyond a predefined meeting time window for the other participant).

At 218, the optimal segment matching process 200 may determine if the carpool route has been completed. According to at least one embodiment, the optimal segment matching process 200 may track participants on a route via GPS location. Once the participants are present at the end point of the carpool route, the optimal segment matching process 200 may determine that the carpool route has been completed. If the optimal segment matching process 200 determines that the carpool route may not have completed, the optimal segment matching process 200 may continue to monitor the route at 216.

However, if the optimal segment matching process 200 determines that the carpool route may have completed at 218, the optimal segment matching process 200 may record data associated with the carpool transaction in a storage device, such as a hard disk drive within the carpool server 106 (FIG. 1) at 220. The recorded carpool route data may include information such as the timeliness of a participant and how many miles a participant may have driven. The recorded data associated with the completed carpool transaction may be used in subsequent carpool matches (e.g., at 206).

Figure 3:
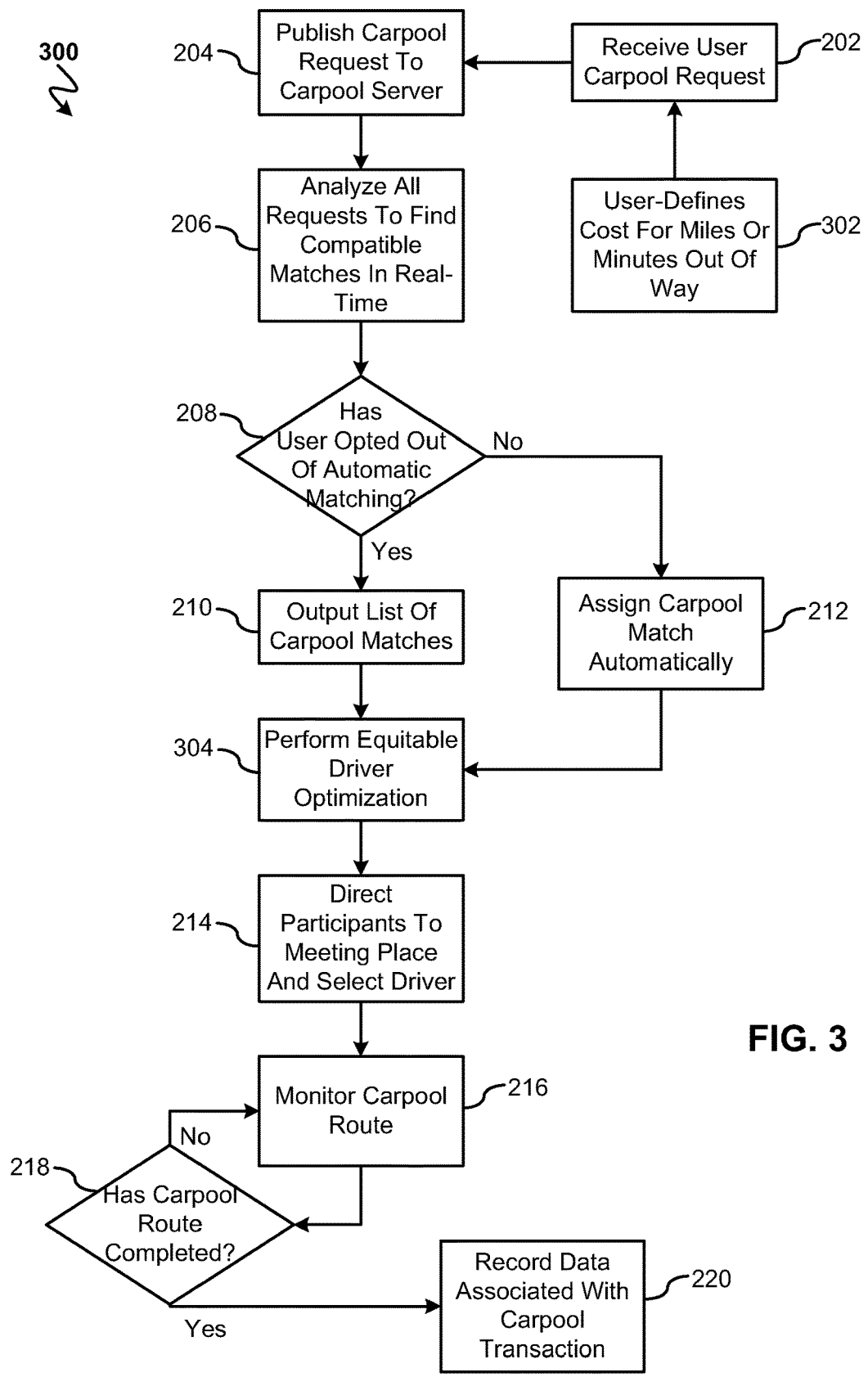
FIG. 3 is an operational flow chart illustrating a process for dynamic real-time carpool matching with approximate route segment matching according to at least one embodiment.

Referring now to FIG. 3, an operational flow chart illustrating the exemplary equitable ride sharing process 300 by the dynamic carpool matching program 112 (FIG. 1) according to at least one embodiment is depicted. The equitable ride sharing process 300 may function similarly to the optimal segment matching process 200 (FIG. 2) with added steps to incorporate equitable carpool assignments and approximate route segment matching.

At 302, the user may provide equity information that may define how much flexibility the user may have in terms of distance (e.g., miles) or time (e.g., minutes) in a carpool route before submitting a carpool request at 202. According to at least one embodiment, the user may indicate, as input to a frontend program 104 (FIG. 1), the amount of additional miles and/or minutes the user may tolerate in order to have a carpool match. For example, if the total distance a participant may travel to get to work may be ten miles, and the participant indicates that the participant may be willing to go two miles beyond that to carpool; the equitable ride sharing process 300 may consider alternate routes of up to twelve total miles in length. Additionally, the user may indicate the costs to the user to deviate from an ideal route using the user's car to accommodate other participants. For example, the user may indicate that each mile beyond a shortest route for the user's commute may cost the user one dollar per mile. If the participant may be asked to take a non-ideal route to reach a pick up or drop off point, the participant may receive monetary compensation per the costs the user indicated. Participants may agree on capping the amount of money that a participant may charge. Thus, if the cost to have a participant involved in a carpool route may exceed the monetary outlay cap, the participant may be filtered out from carpool match analysis later. The handling of monetary transaction between participants may be performed by the third party service in the interest of security.

After the user provides equity information, the equity information may be combined with the match information to generate the carpool request. The carpool request may then be sent to the equitable ride sharing process 300 at 202. The request may then be published to the carpool server 106 (FIG. 1) by the equitable ride sharing process 300 at 204.

Next, at 206, the equitable ride sharing process 300 may analyze the requests stored in the carpool server to find compatible matches in real-time. The compatible match analysis made by the equitable ride sharing process 300 may incorporate the equity information provided by the participant users. Thus, the equitable ride sharing process 300 may calculate alternate routes that may not exceed the equity thresholds (e.g., distance or time threshold values) of the participants to create carpool matches. The equitable ride sharing process 300 may create a list of plausible matches as a result of the analysis.

Then, at 208, equitable ride sharing process 300 may determine if the user has opted out of automatic carpool matching based on the user's preference. If the equitable ride sharing process 300 determines that the user has opted out of automatic matching at 208, the equitable ride sharing process 300 may output the list of matches to the user to select at 210. However, if the equitable ride sharing process 300 determines that the user has not opted out of automatic carpool matching at 208, the equitable ride sharing process 300 may automatically select the most viable match for the user.

Once the user responds with a carpool match choice at 210, or if the equitable ride sharing process 300 automatically selected the most viable carpool match choice at 212, the equitable ride sharing process 300 may perform an equitable driver optimization at 304. The equitable driver optimization may be based on the equitable information of the carpool participants associated with the carpool match. According to at least one embodiment, the equitable driver optimization may be utilized to equitably distribute driving responsibilities so that none of the potential drivers may have a net equity advantage. For example, if driver $D_1$ values his time at X dollars per hour and driver $D_2$ values his time at Y dollars per hour with X>Y, then a meeting point for $D_1$ and $D_2$ may be chosen to suit $D_1$, with $D_1$ paying $D_2$ an inconvenience cost of (X+Y)/2 dollars per hour.

After the equitable driver optimization completes, the equitable ride sharing process 300 may direct participants to a meeting place and select a driver at 214. Then, at 216, the equitable ride sharing process 300 may monitor the carpool route. Next, at 218, the equitable ride sharing process 300 may determine if the carpool route has been completed. If the equitable ride sharing process 300 determined that the carpool route may not have been completed at 218, the equitable ride sharing process 300 may continue monitoring the carpool route at 216. However, if the equitable ride sharing process 300 determined that carpool route may have been completed at 218, the equitable ride sharing process 300 may record data associated with the carpool transaction at 220.

Figure 4:
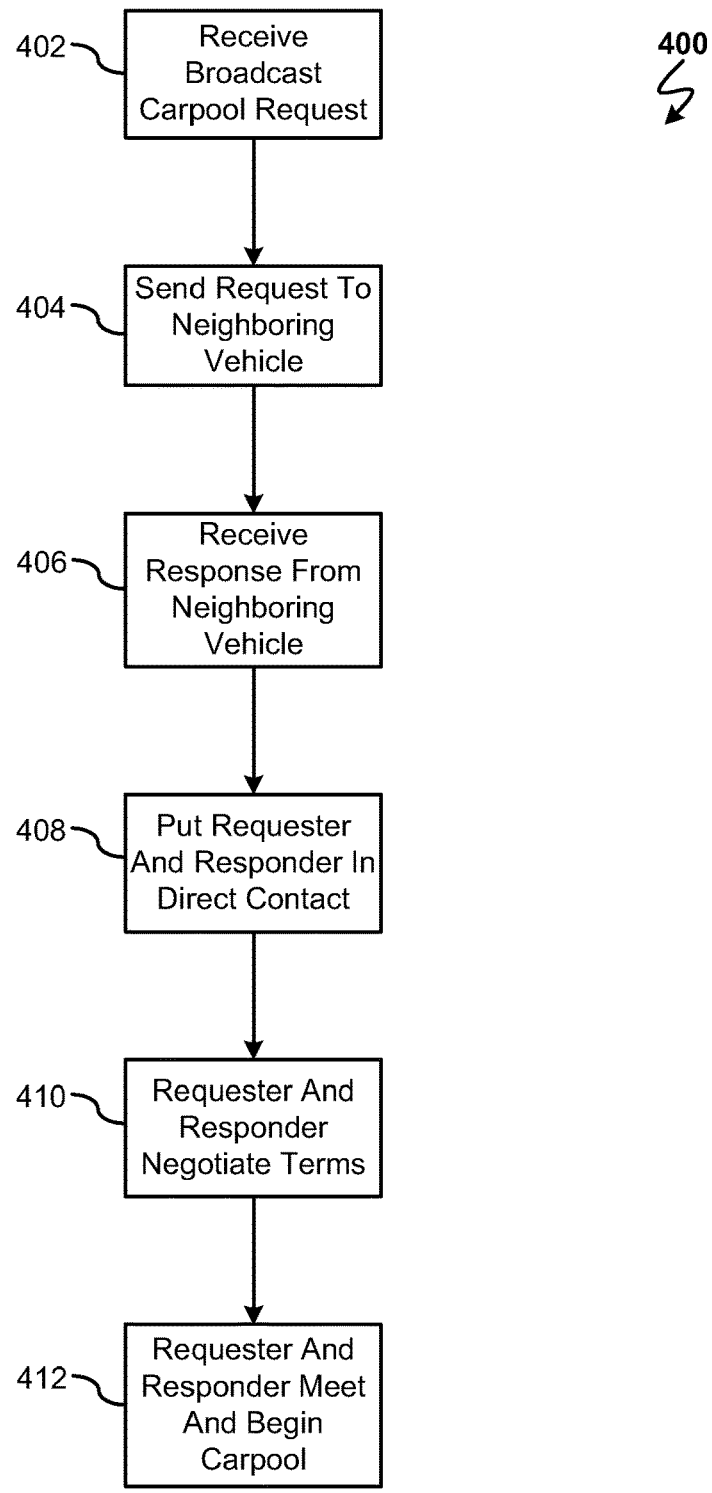
FIG. 4 is an operational flow chart illustrating a process for just-in-time peer-to-peer carpool matching according to at least one embodiment.

Referring now to FIG. 4, an operational flow chart illustrating the exemplary peer-to-peer matching process 400 by the dynamic carpool matching program 112 (FIG. 1) according to at least one embodiment is depicted.

At 402, a vehicle, such as a car, may broadcast a request to carpool to neighboring vehicles. According to at least one embodiment, the requesting vehicle may generate a request to carpool containing data such as the vehicle's current location and destination that the vehicle may then broadcast (e.g., over a cellular network) to a carpool server 106 (FIG. 1). According to at least one other embodiment, requesting vehicles may directly communicate with neighboring vehicles without employing an intermediary carpooling server 106 (FIG. 1) and service.

Next, at 404, the peer-to-peer matching process 400 running on the carpooling server 106 (FIG. 1) may identify vehicles neighboring the requesting vehicle and then send the request to the identified neighboring vehicles. According to at least one embodiment, users participating in the carpooling service may agree before participating to have the user's vehicle tracked (e.g., by GPS) and have a means to communicate the vehicles location to the peer-to-peer matching process 400 (e.g., through a cellular network link integrated with the vehicle).

Then, at 406, the peer-to-peer matching process 400 may receive a response from a neighboring vehicle accepting the carpool request. According to at least one embodiment, a neighboring vehicle may display a notification through the frontend program 104 (FIG. 1) containing the carpool request to the user and present the user an option to accept the request. If the user accepts the request, the response may be sent over a communication network 114 (FIG. 1) to the carpooling server 106 (FIG. 1).

At 408, the peer-to-peer matching process 400 may put the requesting vehicle and the responding vehicle (i.e., neighboring vehicle) in direct contact. According to at least one embodiment, the requesting vehicle and responding vehicle may be put in contact through a cell phone call or other per-to-peer method.

Next, at 410, the requester (i.e., driver of the requesting vehicle) and responder (i.e., driver of the neighboring vehicle) may negotiate the terms of the carpool. According to at least one embodiment, the requester and responder may negotiate a meeting point, drop off point, the driver, and monetary exchange. A third party service may be used to handle monetary exchanges. Then, at 412, the requester and responder may meet at the negotiated meeting point and begin the negotiated carpool.

It may be appreciated that that the embodiments described in FIGS. 2, 3, and 4 may also be applied to self-driving vehicles and services related to self-driving vehicles. It may also be appreciated that FIGS. 2, 3, and 4 provide only an illustration of a few embodiments and do not imply any limitations with regard to how different embodiments may be implemented. For example, as previously described at 206 (FIG. 2), carpool matches may be made by the dynamic carpool matching program 112 (FIG. 1) based on searching stored carpool requests for overlapping carpool route segments. By expanding carpool matches to include carpool requests that may partially overlap (i.e., route segments may overlap) instead of only matching complete routes, more potential matches may be made. Composite carpool routes having overlapping segments may be found that include different drivers for individual route segments and may further use mass transit or walking for segments that may not have another efficient match. Many modifications to the depicted embodiments may be made based on design and implementation requirements.

Figure 5:
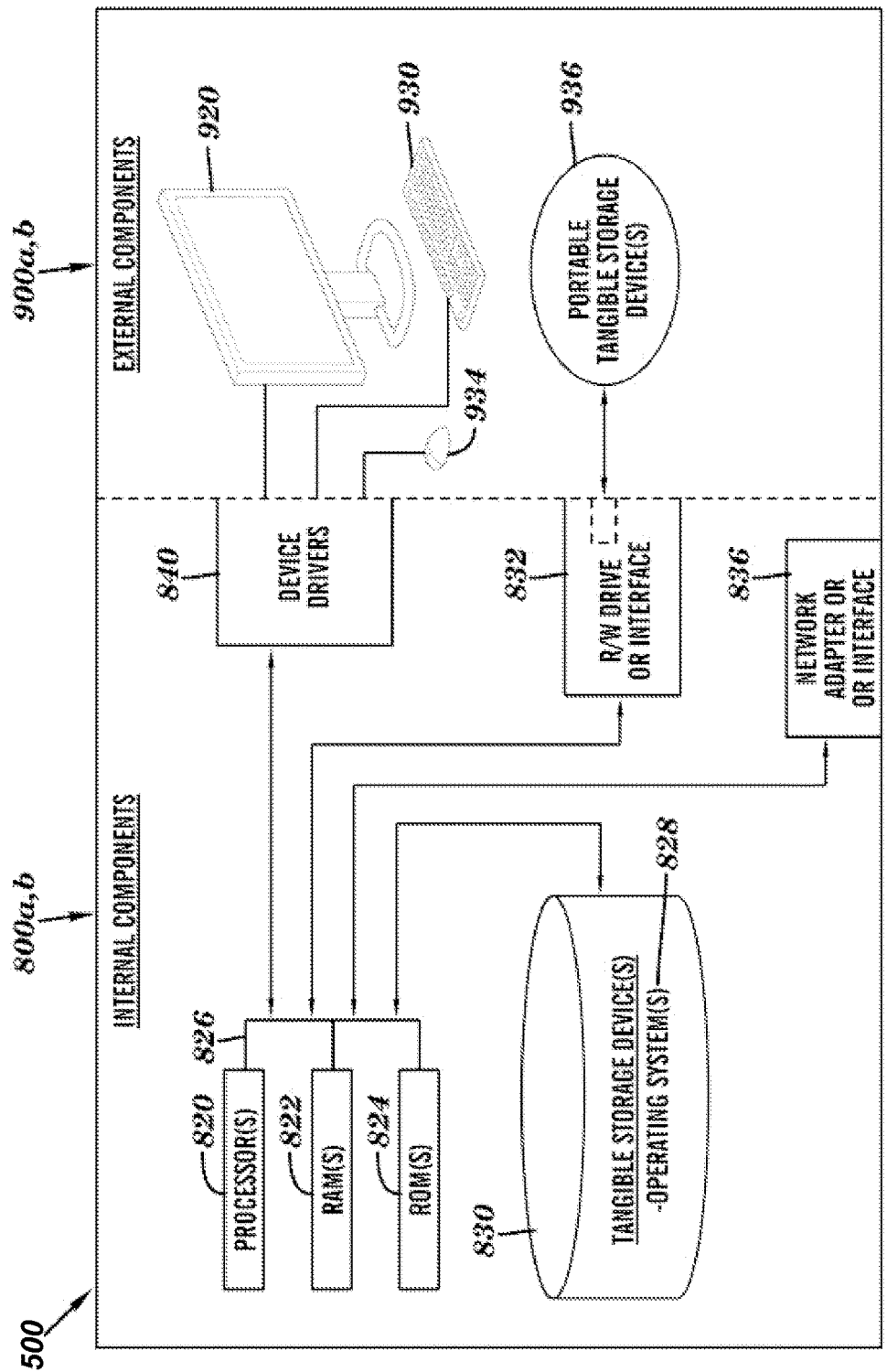
FIG. 5 is a block diagram of internal and external components of computers and servers depicted in FIG. 1 according to at least one embodiment.

FIG. 5 is a block diagram 500 of internal and external components of computers depicted in FIG. 1 in accordance with an illustrative embodiment of the present invention. It should be appreciated that FIG. 5 provides only an illustration of one implementation and does not imply any limitations with regard to the environments in which different embodiments may be implemented. Many modifications to the depicted environments may be made based on design and implementation requirements.

Data processing system 800, 900 is representative of any electronic device capable of executing machine-readable program instructions. Data processing system 800, 900 may be representative of a smart phone, a computer system, PDA, or other electronic devices. Examples of computing systems, environments, and/or configurations that may represented by data processing system 800, 900 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 (FIG. 1), and network server 106 (FIG. 1) may include respective sets of internal components 800a, b and external components 900a, b illustrated in FIG. 5. Each of the sets of internal components 800a, b includes one or more processors 820, one or more computer-readable RAMs 822 and one or more computer-readable ROMs 824 on one or more buses 826, and one or more operating systems 828 and one or more computer-readable tangible storage devices 830. The one or more operating systems 828 and programs such as a dynamic carpool matching program 112 (FIG. 1), may be stored on one or more computer-readable tangible storage devices 830 for execution by one or more processors 820 via one or more RAMs 822 (which typically include cache memory). In the embodiment illustrated in FIG. 4, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800a, b also includes a R/W drive or interface 832 to read from and write to one or more portable computer-readable tangible storage devices 936 such as a CD-ROM, DVD, memory stick, magnetic tape, magnetic disk, optical disk or semiconductor storage device. The dynamic carpool matching program 112 (FIG. 1) can be stored on one or more of the respective portable computer-readable tangible storage devices 936, read via the respective R/W drive or interface 832 and loaded into the respective hard drive 830.

Each set of internal components 800a, b may also include network adapters (or switch port cards) or interfaces 836 such as a TCP/IP adapter cards, wireless wi-fi interface cards, or 3G or 4G wireless interface cards or other wired or wireless communication links. The frontend program 104 (FIG. 1) in client computer 102 (FIG. 1) and the dynamic carpool matching program 112 (FIG. 1) in network server computer 106 (FIG. 1) can be downloaded from an external computer (e.g., server) via a network (for example, the Internet, a local area network or other, wide area network) and respective network adapters or interfaces 836. From the network adapters (or switch port adaptors) or interfaces 836, the frontend program 104 (FIG. 1) in client computer 102 (FIG. 1) and the dynamic carpool matching program 112 (FIG. 1) in network server computer 106 (FIG. 1) are loaded into the respective hard drive 830. The network may comprise copper wires, optical fibers, wireless transmission, routers, firewalls, switches, gateway computers and/or edge servers.

Each of the sets of external components 900a, b can include a computer display monitor 920, a keyboard 930, and a computer mouse 934. External components 900a, b can also include touch screens, virtual keyboards, touch pads, pointing devices, and other human interface devices. Each of the sets of internal components 800a, b also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for real-time carpool matching, the method comprising:

receiving, by a carpool server, a plurality of carpool requests from a plurality of participant devices via a communication network, wherein each carpool request comprises a plurality of route segments and a participant;

identifying, in real-time, a plurality of overlapping segments based on the received plurality of carpool requests;

generating at least one carpool route in real time for a user by combining the identified plurality of overlapping segments, wherein the generated at least one carpool route has a route destination that matches a requested destination associated with a carpool request made by the user, and wherein the user is traveling in a user vehicle;

assigning each carpool route within the at least one carpool route a viability value;

assigning a selected carpool match automatically for the user associated with the generated at least one carpool route, based on the assigned viability value associated with each carpool route within the at least one carpool route;

choosing a segment driver from a plurality of carpool participants for each overlapping segment within the generated carpool route, wherein the plurality of carpool participants includes the participants associated with the plurality of overlapping segments;

sending, by the carpool server, the selected carpool match and a plurality of segment drivers to the plurality of carpool participant devices over the communication network, wherein the sent carpool match has a route;

tracking geolocations of the plurality of carpool participants via a global positioning system (GPS), wherein the tracked geolocations comprise a carpool participant geolocation of each carpool participant within the plurality of carpool participants, a segment driver geolocation of each segment driver within the plurality of segment drivers and a user geolocation of the user;

determining that a segment driver within the plurality of segment drivers has deviated from the route based on comparing a distance from the segment driver geolocation to the route and determining that the distance exceeds a threshold;

in response to determining that the segment driver has deviated from the route, generating an alert for the segment driver;

sending the generated alert to an electronic device associated with the segment driver;

determining that the segment driver is not participating in response to the sent alert;

in response to determining that the segment driver that has deviated is not participating, identifying a neighboring vehicle of a carpool participant in proximity to the user vehicle based on a vehicle distance between the carpool participant geolocation corresponding with the neighboring vehicle and the user geolocation corresponding with the user vehicle;

assigning a substitute carpool match, based on the identified neighboring vehicle; and sending, via a cellular network, the assigned substitute carpool match to the user vehicle.

2. The method of claim 1, further comprising:

determining that the user associated with the determined at least one carpool route has opted out of automatic carpool matching;

sending the at least one carpool route to the user based on determining that the user has opted out of automatic carpool matching; and receiving a new carpool route from the user based on the sent at least one carpool route.

3. The method of claim 1, wherein each carpool request within the plurality of carpool requests has a plurality of passenger acceptability criteria.

4. The method of claim 3, wherein generating the at least one carpool route comprises comparing the plurality of route segments based on a route overlap value and the plurality of passenger acceptability criteria.

5. The method of claim 1, wherein choosing the segment driver from the plurality of carpool participants comprises randomly choosing the driver or allowing the plurality of carpool participants to consent to choose the driver from the plurality of carpool participants.

6. The method of claim 1, further comprising:
monitoring a geolocation associated with the plurality of carpool participants;
determining if a distance between the geolocation and a carpool route associated with the selected carpool match is outside of a predefined threshold value; and
generating an alert based on determining that the distance is outside of the predefined threshold value.

7. The method of claim 1, wherein each carpool request within the plurality of carpool requests has a distance flexibility preference and a time flexibility preference.

8. The method of claim 7, wherein generating the at least one carpool route comprises considering an alternate route that fits within the time flexibility preference and the distance flexibility preference.

9. A computer system for real-time carpool matching, comprising:
one or more processors, one or more non-transitory computer-readable memories, one or more non-transitory computer-readable tangible storage medium, and program instructions stored on at least one of the one or more tangible storage medium for execution by at least one of the one or more processors via at least one of the one or more memories, wherein the computer system is capable of performing a method comprising:
receiving, by a carpool server, a plurality of carpool requests from a plurality of participant devices via a communication network, wherein each carpool request comprises a plurality of route segments and a participant;
identifying, in real-time, a plurality of overlapping segments based on the received plurality of carpool requests;
generating at least one carpool route in real time for a user by combining the identified plurality of overlapping segments, wherein the generated at least one carpool route has a route destination that matches a requested destination associated with a carpool request made by the user, and wherein the user is traveling in a user vehicle;
assigning each carpool route within the at least one carpool route a viability value;
assigning a selected carpool match automatically for the user associated with the generated at least one carpool route, based on the assigned viability value associated with each carpool route within the at least one carpool route;
choosing a segment driver from a plurality of carpool participants for each overlapping segment within the generated carpool route, wherein the plurality of carpool participants includes the participants associated with the plurality of overlapping segments;
sending, by the carpool server, the selected carpool match and a plurality of segment drivers to the plurality of carpool participant devices over the communication network, wherein the sent carpool match has a route;
tracking geolocations of the plurality of carpool participants via a global positioning system (GPS), wherein the tracked geolocations comprise a carpool participant geolocation of each carpool participant within the plurality of carpool participants, a segment driver geolocation of each segment driver within the plurality of segment drivers and a user geolocation of the user;
determining that a segment driver within the plurality of segment drivers has deviated from the route based on comparing a distance from the segment driver geolocation to the route and determining that the distance exceeds a threshold;
in response to determining that the segment driver has deviated from the route generating an alert for the segment driver;
sending the generated alert to an electronic device associated with the segment driver;
determining that the segment driver is not participating in response to the sent alert;
in response to determining that the segment driver that has deviated is not participating, identifying a neighboring vehicle of a carpool participant in proximity to the user vehicle based on a vehicle distance between the carpool participant geolocation corresponding with the neighboring vehicle and the user geolocation corresponding with the user vehicle;
assigning a substitute carpool match, based on the identified neighboring vehicle; and
sending, via a cellular network, the assigned substitute carpool match to the user vehicle.

10. The computer system of claim 9, further comprising:
determining that the user associated with the determined at least one carpool route has opted out of automatic carpool matching;
sending the at least one carpool route to the user based on determining that the user has opted out of automatic carpool matching; and
receiving a new carpool route from the user based on the sent at least one carpool route.

11. The computer system of claim 9, wherein each carpool request within the plurality of carpool requests has a plurality of passenger acceptability criteria.

12. The computer system of claim 11, wherein generating the at least one carpool route comprises comparing the plurality of route segments based on a route overlap value and the plurality of passenger acceptability criteria.

13. The computer system of claim 9, wherein choosing the segment driver from the plurality of carpool participants comprises randomly choosing the driver or allowing the participants to consent to choose the driver from the plurality of carpool participants.

14. The computer system of claim 9, further comprising:
monitoring a geolocation associated with the plurality of carpool participants;
determining if a distance between the geolocation and a carpool route associated with the selected carpool match is outside of a predefined threshold value; and
generating an alert based on determining that the distance is outside of the predefined threshold value.

15. The computer system of claim 9, wherein each carpool request within the plurality of carpool requests has a distance flexibility preference and a time flexibility preference.

16. A computer program product for real-time carpool matching, comprising:
one or more non-transitory computer-readable storage medium and program instructions stored on at least one of the one or more non-transitory computer-readable storage medium, the program instructions executable by a processor, the program instructions comprising:
program instructions to receive, by a carpool server, a plurality of carpool requests from a plurality of participant devices via a communication network, wherein each carpool request comprises a plurality of route segments and a participant;
program instructions to identify, in real-time, a plurality of overlapping segments based on the received plurality of carpool requests;
program instructions to generate at least one carpool route in real time for a user by combining the identified plurality of overlapping segments, wherein the generated at least one carpool route has a route destination that matches a requested destination associated with a carpool request made by the user, and wherein the user is traveling in a user vehicle;
program instructions to assign each carpool route within the at least one carpool route a viability value;
program instructions to assign a selected carpool match automatically for the user associated with the generated at least one carpool route, based on the assigned viability value associated with each carpool route within the at least one carpool route;
program instructions to choose a segment driver from a plurality of carpool participants for each overlapping segment within the generated carpool route, wherein the plurality of carpool participants includes the participants associated with the plurality of overlapping segments;
program instructions to send, by the carpool server, the selected carpool match and a plurality of segment drivers to the plurality of carpool participant devices over the communication network, wherein the sent carpool match has a route;
program instructions to track geolocations of the plurality of carpool participants via a global positioning system (GPS), wherein the tracked geolocations comprise a carpool participant geolocation of each carpool participant within the plurality of carpool participants, a segment driver geolocation of each segment driver within the plurality of segment drivers and a user geolocation of the user;
program instructions to determine that a segment driver within the plurality of segment drivers has deviated from the route based on comparing a distance from the segment driver geolocation to the route and determining that the distance exceeds a threshold;
program instructions to, in response to determining that the segment driver has deviated from the route, generate an alert for the segment driver;
program instructions to send the generated alert to an electronic device associated with the segment driver;
program instructions to determine that the segment driver is not participating in response to the sent alert;
program instructions to, in response to determining that the segment driver that has deviated is not participating, identify a neighboring vehicle of a carpool participant in proximity to the user vehicle based on a vehicle distance between the carpool participant geolocation corresponding with the neighboring vehicle and the user geolocation corresponding with the user vehicle;
program instructions to assign a substitute carpool match, based on the identified neighboring vehicle; and
program instructions to send, via a cellular network, the assigned substitute carpool match to the user vehicle.

17. The computer program product of claim 16, further comprising:
program instruction to determine that the user associated with the determined at least one carpool route has opted out of automatic carpool matching;
program instruction to send the at least one carpool route to the user based on determining that the user has opted out of automatic carpool matching; and
program instruction to receive a new carpool route from the user based on the sent at least one carpool route.

18. The computer program product of claim 17, wherein each carpool request within the plurality of carpool requests has a plurality of passenger acceptability criteria.

* * * * *